US 6,545,606 B2

(12) United States Patent
Piri et al.

(10) Patent No.: US 6,545,606 B2
(45) Date of Patent: Apr. 8, 2003

(54) DEVICE AND METHOD FOR ALERTING TO THE NEED TO RECOVER SOMETHING, IDENTIFYING IT, AND DETERMINING ITS LOCATION FOR PURPOSES OF RECOVERY

(75) Inventors: John L. Piri, Ridgecrest, CA (US); Arthur R. Skatvold, Ridgecrest, CA (US); Charles T. Nash, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/771,168

(22) Filed: Jan. 25, 2001

(65) Prior Publication Data

US 2002/0097157 A1 Jul. 25, 2002

(51) Int. Cl.[7] ............................................. G08B 23/00
(52) U.S. Cl. ........................... 340/573.1; 340/825.49; 340/825.36; 340/539; 340/989; 340/993; 340/636
(58) Field of Search ................... 340/539, 531, 340/540, 573.1, 825.36, 825.49, 989, 993, 573.6, 636

(56) References Cited

U.S. PATENT DOCUMENTS

| 4,662,850 | A |   | 5/1987  | Bostic, Sr. ............... 340/539 |
| 4,702,715 | A |   | 10/1987 | Winick .................... 340/539 |
| 4,714,914 | A | * | 12/1987 | Boe ...................... 340/573.1 |
| 4,813,025 | A |   | 3/1989  | Rowland ................. 340/539 |
| 4,903,243 | A |   | 2/1990  | Turner, Jr. ............... 340/539 |
| 4,932,910 | A |   | 6/1990  | Hayday .................. 340/539 |
| 5,006,831 | A |   | 4/1991  | De Solminihac ......... 340/539 |
| 5,030,152 | A |   | 7/1991  | Carr et al. .............. 340/604 |
| 5,326,297 | A | * | 7/1994  | Loughlin ................ 441/89 |
| 5,408,238 | A |   | 4/1995  | Smith .................... 342/357 |
| 5,414,427 | A |   | 5/1995  | Gunnarsson ............ 341/539 |
| 5,414,432 | A | * | 5/1995  | Penny, Jr. et al. ........ 342/357 |
| 5,463,598 | A | * | 10/1995 | Holland et al. .......... 367/131 |

(List continued on next page.)

OTHER PUBLICATIONS

U.S. patent application Ser. No. 09/548,841, Cheadle et al.

*Primary Examiner*—Daniel J. Wu
*Assistant Examiner*—Daniel Previl
(74) *Attorney, Agent, or Firm*—Earl H. Baugher, Jr.; Anthony J. Serventi; Laura R. Foster (57) ABSTRACT

An alerting mechanism is integrated into a physical support device for use in the event of an accident or emergency. The device provides a signal that alerts potential rescuers about emergency events such as man overboard. In one alternative. it uses a pre-programmed code to provide a positive identification of the individual or object involved. In a typical application, a Personal Locator Beacon (PLB) module is incorporated into a secure pocket of a life vest, the vest having at least one conformable antenna sewn into its upper portion as well as connections from the PLB to the antenna. The alerting mechanism may be used in a cooperative system using special receivers that utilize high temperature superconductor (HTS) RF bandpass filters for minimizing RF interference so that low signal levels may be received reliably. The system may also provide access to a database through common interfaces to wireless communications devices, telephone lines, the Internet, and satellites. The system may also use a programmable electromagnetic element on a plastic card, such as a hotel key card, to establish a secure ID for the user that may be updated periodically, even daily as security requirements dictate. Alternatively, the PLB may be operated at RF frequencies common to guard channels operated by the Coast Guard and civilian agencies such as the Civil Air Patrol. The system may provide information on relative positioning with respect to a rescuer or use GPS resources for absolute positioning.

6 Claims, 4 Drawing Sheets

U.S. PATENT DOCUMENTS

| | | | |
|---|---|---|---|
| 5,517,199 A | 5/1996 | DiMattei | 342/357 |
| 5,650,770 A | 7/1997 | Schlager et al. | 340/539 |
| 5,689,269 A | 11/1997 | Norris | 342/357 |
| 5,710,989 A | 1/1998 | Flood | 340/539 |
| 5,726,663 A | 3/1998 | Moyer et al. | 342/419 |
| 5,742,233 A | 4/1998 | Hoffman et al. | 340/539 |
| 5,748,080 A | 5/1998 | Clay | 340/539 |
| 5,852,401 A | 12/1998 | Kita | 340/539 |
| 5,870,029 A | 2/1999 | Otto et al. | 340/825.36 |
| 5,874,914 A | 2/1999 | Krasner | |
| 5,886,635 A * | 3/1999 | Landa et al. | 340/573.6 |
| 5,905,461 A | 5/1999 | Neher | |
| 5,923,294 A | 7/1999 | Bacelon et al. | |
| 5,929,777 A | 7/1999 | Reynolds | |
| 5,940,004 A * | 8/1999 | Fulton | 340/825.49 |
| 5,945,912 A | 8/1999 | Guldbrand | |
| 5,952,959 A | 9/1999 | Norris | |
| 5,963,130 A | 10/1999 | Schlager et al. | |
| 6,011,510 A | 1/2000 | Yee et al. | |
| 6,016,119 A | 1/2000 | Krasner | |
| 6,023,244 A | 2/2000 | Snygg et al. | |
| 6,066,017 A | 5/2000 | Max et al. | |
| 6,072,429 A | 6/2000 | Crothall et al. | |

\* cited by examiner

DEVICE AND METHOD FOR ALERTING TO THE NEED TO RECOVER SOMETHING, IDENTIFYING IT, AND DETERMINING ITS LOCATION FOR PURPOSES OF RECOVERY

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention pertains to alerting for search and recovery. In particular, a preferred embodiment is a system that uniquely and rapidly identifies a person or object that has gone overboard and aids in locating that person or object in real time.

BACKGROUND

Conventional approaches used to locate individuals in the water are based on visual and audio methods, or both. These obvious first order approaches are effective for many "man overboard" scenarios. There are occasions, however, when an individual may go overboard unnoticed. A good example of a scenario where this is not only possible, but also likely, is the operations deck of a modern U.S. Navy aircraft carrier. The noise environment, coupled with operations at night or in bad weather, including fog and rough seas, sets the scene for an unnoticed "man overboard." The occurrence is further exacerbated when one considers that a modern carrier has a small city of personnel onboard and considerable time may pass before one of its "citizens" is recognized as missing.

Only on rare occasions does an individual go overboard while wearing a radiating emergency locator device that has the necessary power and "robustness" to alert an existing emergency net using the monitored approved RF emergency frequencies. An inherent shortcoming of these systems, in addition to the cost of acquiring and maintaining them, is the high transmit power needed to operate the integral transmitter. For these transmitters to be powered for reliable use, the associated battery(ies) must be in good working order when needed and capable of operation over an extended period. Since these devices must be capable of relatively high-power transmission, they are large and therefore inconvenient to have on one's person at all times. Further, the batteries needed to power these devices are necessarily large and may not have sufficient operating life to insure location should a rescue effort require more than a few hours to effect, especially at low ambient temperatures. Generally, these devices are associated with small boats or inflatable life rafts carried on larger watercraft in case of an emergency. For this reason, size, weight, portability, and "wearability" or comfort, are not of prime consideration in their design. Finally, given the variety of conditions that may initiate a "man overboard" scenario, one includes an event also rendering an individual unconscious. In this case, even were the larger device available, initiation of operation would have to be via an automated process, e.g., as provided via a sensor that initiates a signal to activate the device automatically upon immersion in water after a few seconds. Devices exist which address some but not all of requirements for a rugged, small, light weight, reliable, low power, emergency alerting device capable of transmitting an encoded signal, all constituent parts of which are unobtrusively incorporated in a lifejacket or flotation device suitable for comfortable daily wear while performing work.

Examples of emergency beacon devices for personnel rescue at sea that are provided as separate units from a flotation device not worn continuously while shipboard include that described in:

U.S. Pat. No. 4,702,715, Automatic Emergency Rescue Apparatus, issued to Winick, Oct. 27, 1987, in which only a transmitter is located on a person who goes overboard;

U.S. Pat. No. 4,813,025, Safely Alert and Locating System, issued to Rowland et al., Mar. 14, 1989, employing a system using ultrasonics aboard a watercraft to query a device carried on a person who goes overboard in order to determine who has gone overboard and the distance and direction to that person;

U.S. Pat. No. 4,903,243, Marine Transponder Systemn, issued to Turner, Feb. 20, 1990; in which a transponder may be carried by a person onboard a watercraft and, in the event that person goes overboard, the transponder may be interrogated by a system onboard the watercraft at which time the transponder will respond with a coded signal, thus identifying the person and saving transponder system power by responding (light/sound/RF) only when queried by a system available to a possible rescue team;

U.S. Pat. No. 4,932,910, Emergency Location Marker System, issued to Hayday, Jun. 12, 1990, in which an onboard marker system, containing a flotation device and including an RF beacon and other audio-visual location indicators located on a self-erecting tower, is thrown overboard upon the occurrence of a man overboard event;

U.S. Pat. No. 5,006,831, Device Providing for the Safety of a Man Overboard, issued to de Solminihac, Apr. 9, 1991, in which an alarm pack worn about the neck of a watercraft's passenger provides an acoustic sensing of the event, detects an acoustic beacon onboard the watercraft and jettisons the "position-fixing" beacon from the watercraft into the general vicinity of the victim in the water whereupon the beacon provides location input to a receiver carried onboard the watercraft or other possible rescue vehicle;

U.S. Pat. No. 5,408,238, Location of Overboard Person or Object or of Water-Chemical Interface, issued to Smith, Terry J., Apr. 18, 1995, in which a somewhat bulky floating object, having an activatable satellite positioning system receiver and a transmitter and antenna to serve as a beacon, is tossed into the water near where a person has fallen overboard, and serves as a locating device;

U.S. Pat. No. 5,710,989, Water-Activated Emergency Radio Beacon, issued to Flood, Jan. 20, 1998, describing an emergency position indicating radio beacon operating at RF on guard channel, of conventional appearance, incorporating a water-activated switch, and sized for mounting on a life vest:

U.S. Pat. No. 5,748,080, Overboard Safety Device, issued to Clay, May 5, 1998, describing a safety signaling device containing both an RF beacon and a light signaling source with rechargeable battery, to be safety-pinned to a person's clothing and activated upon falling overboard;

U.S. Pat. No. 5,852,401, Distress Message Signal Sending Device, issued to Kita, Dec. 22, 1998, embodied in a wristwatch type device that, upon occurrence of an emergency condition as detected by at least two sensors integral to the device, uses an integral signal generator to send distress signals based on GPS-provided location information from a GPS receiver also integral to the device;

U.S. Pat. No. 5,929,777, Radio Activated Personal Infrared Distress Beacon, issued to Reynolds, Jul. 27, 1999, provides a personal infrared beacon, suitable for carrying on the body, that may be part of a communications network and may be interrogated by the network or activated separately by the user as an emergency signal capable of providing a unique user code and location of the user;

U.S. Pat. No. 5,945,912, Ocean Safe, issued to Guldbrand, Aug. 31, 1999, details a rescue system for attachment to a person, the system incorporating numerous aids such as a strobe light, flashlight, and mirror, and also including a transmitter for emitting an emergency signal to be received by an associated shipboard direction finding receiver upon initiation of the signal, initiation most probably occurring via input from a moisture sensor that detects immersion of the device in water; and U.S. Pat. No. 6,011,510, GPS Based Search and Rescue Transceiver, issued to Yee et al., Jan. 4, 2000, detailing a survival radio for carry by individuals in the event an emergency should arise, the radio providing GPS-positioning to rescue units via an integral GPS receiver, a microcontroller, and a transceiver for responding to coded interrogation signals from rescue personnel.

An example of an emergency device for personnel rescue that is incorporated in a flotation device that may be worn continuously while near deep water include that described in:

U.S. Pat. No. 4,662,850, Life Preserving Device with Pressure Responsive Switch, issued to Bostic, May 5, 1987, describing an inflatable device capable of use by two persons and incorporating a switch and sensor, a membrane in a preferred embodiment, sensitive to inflation pressure of the device for automatically initiating a separately attached beacon (not claimed) incorporating transmitter, antenna, and battery as a power source;

U.S. Pat. No. 5,030,152, Life Saving Device, issued to Carr et al., Jul. 9, 1991, in which a buoyancy device attached to an individual is inflated upon contact with water, providing both flotation and a transmitter that sends a signal to a remote receiver associated with an alarm that alerts others to the event; and U.S. Pat. No. 5,326,297, Life Jacket, issued to Loughlin, Jul. 5, 1994, in which various signaling devices such as flares, strobe light, solar powered flares, signal balloon, and a dual audio-beacon signaling device, at least one of which, the audio-beacon, is activated automatically upon entry into the water, and all of which are attached "chock-a-block" in various pouches and external attachments to a flotation device designed to slip over a wearer's head and remain suspended by shoulder straps.

Further, several recent subsystems relate to providing improved reaction times in effecting a rescue, some of which are embodied in the following patents:

U.S. Pat. No. 5,517,199, Emergency Locator Device, issued to DiMattei, May 14, 1996, in which an efficient processing scheme is incorporated for providing geoposition data through satellite links to rescue units in a timely fashion while also minimizing the risk of false alarms;

U.S. Pat. No. 5,689,269, GPS Relative Position Detection System, issued to Norris, Nov. 18, 1997, and U.S. Pat. No. 5,952,959, GPS Relative Position Detection System also issued to Norris, Sep. 14, 1999, embodying at least two transceivers, one carried by the rescuer and the other by the victim, capable of receiving, processing, and re-transmitting geoposition data derived from GPS signals for the purpose of providing relative position of the two transceivers with respect to one another;

U.S. Pat. No. 5,726,663, Survival Radio Interrogator, issued to Moyer et al., Mar. 10, 1998, in which, upon request, an encoded message is transmitted from an interrogator to a radio carried by an individual whereupon the radio, using GPS geoposition data on its own position, transmits, in an encoded message, this geoposition data to facilitate rescue; and U.S. Pat. No. 5,963,130, Self-Locating Remote Monitoring System, issued to Schlager et al., Oct. 5, 1999, in which, inter alia, special GPS transreceivers carried by an individual are used with various processors and sensors for detecting water immersion and determining the distance of the individual from an associated base station to enable transmission of a signal that triggers an alarm to alert potential rescuers.

Related technology that serves to monitor the status of selected individuals or objects, such as for monitoring parolees, children, or those with physical or mental disabilities, such as Alzheimer's disease, is described in the following:

U.S. Pat. No. 5,650,770, Self-Locating Remote Monitoring Systems, issued to Schlager et al., Jul. 22, 1997, describing a personal alarm system including, a variety of sensors, a remote transceiver/processor to be worn by an individual, and a central monitoring station that communicates via a two-way handshake to ensure reliability and which includes a variable power transmitter for the remote, such that in the absence of an emergency the remote transmits at low power levels and if the remote detects that it has moved beyond a minimum distance from the monitoring station, the power level is increased to insure reliable contact;

U.S. Pat. No. 5,742,233, Personal Security and Tracking System, issued to Hoffman et al., Apr. 21, 1998, in which a personal alarm incorporating a signaling unit, a GPS or similar receiver, a wireless communication device such as a cellular phone, and a remote alarm switch is adapted for wear on a person so that an alarm may be sent automatically or manually to a central receiving station that may also query the personal alarm system independently of any requirement for a transmission from the alarm system;

U.S. Pat. No. 5,870,029, Remote Mobile Monitoring and Communication System, issued to Otto et al., Feb. 9, 1999, describing a monitoring system that tracks a person or object within a prescribed area and includes a mobile base station, a central control center, a small mobile signaling device carried on the person or object, and a geolocating means, in general to be used to track parolees and those under house arrest or for monitoring the location of valuable objects such as luxury cars;

U.S. Pat. No. 5,905,461, Global Positioning Satellite Tracking Device, issued to Neher, May 18, 1999, detailing a tracking system using GPS to determine the whereabouts of a person or object that incorporates a signaling device with geoposition capability to be carried on the person, the signal to be sent to a relay station in the vicinity of the person or object for forwarding to a central monitoring and validation station;

Finally, there are a number of devices that use GPS or communications satellites and mobile GPS receivers to achieve portions of an emergency alert, to include:

U.S. Pat. No. 5,414,432, Position Locating Transceiver, issued to Penny et al., May 9, 1995, provides a hand-portable radio with integral GPS receiver and a processor/transceiver for sending emergency access messages that overlap a prescribed time window in a receiver on a satellite, such as a MILSAT satellite, with information on an individual's position for alerting to emergency situations;

U.S. Pat. No. 5,923,294, Navigation System Allowing Real Time Coordination of the Displacement of Mobiles Travelling Out of Direct Line of Sight, issued to Bacelon et al., Jul. 13, 1999, describing a method for aligning movement of at least two mobile stations with respect to each other using onboard geopositioning transceiver/processor/displays in communication with a central control station;

U.S. Pat. No. 6,016,119, Method and Apparatus for Determining the Location of an Object which May Have an Obstructed View of the Sky, issued to Krasner, Jan. 18, 2000, and U.S. Pat. No. 5,874,914, GPS Receiver Utilizing a Communication Link, issued to Krasner, Feb. 23, 1999, the former detailing a more efficient method of processing GPS for determining position of an object "hidden" from satellite view relative to a fixed position within satellite view and further facilitating the use of smaller portable devices having low power requirements for applications such as may occur beneath the ocean's surface and the latter providing for effective power management of a system employing GPS transceivers; and U.S. Pat. No. 6,072,429, Integrated Position Determination System and Radio Transceiver Incorporating Common Components, issued to Crothall et al., Jun. 6, 2000, using common components for multiple functions, incorporates numerous subsystems, previously separately housed, into a single device as an integrated position determination network, suitably portable but not necessarily wearable.

Additionally, compact, light, inexpensive, yet robust antennas to be used with transceivers exist, but are somewhat specialized, as evident in:

U.S. Pat. No. 5,414,427, Device for Information Transmission, issued to Gunnarsson, May 9, 1995, details an inexpensive, durable, light, and compact transponder for receiving a microwave signal that is further processed and encoded, and re-transmitting the encoded signal using a microstrip antenna for effecting gain through an antenna design that assures a specific directionality of the transmitted signals while minimizing space required for mounting the antenna; and U.S. Pat. No. 6,023,244, Microstrip Antenna Having a Metal Frame for Control of an Antenna Lobe, issued to Snygg et al., Feb. 8, 2000, in which metal frames are used in microstrip antennas to control unwanted sidelobes and achieve improved directionality regardless of the size of the antenna's ground plane.

None of the technology included in the above patents incorporates a low cost, reliable, yet robust, identification and alarm system unobtrusively built into flotation apparel suitable for wear on a daily basis or as a covering for valuable equipment subject to harsh environments. In a preferred embodiment of the present invention, the apparel is worn while performing tasks that may require strenuous effort and dexterity of the wearer that demands extraordinary flexibility and durability from the apparel, while the covering is used in the most environmentally challenging environments encountered at sea.

SUMMARY OF THE INVENTION

A preferred embodiment of the present invention provides a method and apparatus, using electronically encoded signaling for alerting to the position of the person or object, for timely alerting of the need for performing search and recovery operations. It also provides positive identification of the person or object requiring recovery, while providing interim survival means such as flotation. All of these requirements are to be met for an extended period of 72 hours though it is often imperative that personnel rescue operations at sea be conducted within a very short interval because of the water temperature. During particularly adverse conditions, 30 minutes immersion may be fatal, thus the alerting system must work within seconds of entry into the water. Although specifically designed for operations at sea, it has applications for any location, including those internal to large manmade complexes or even natural enclosures such as caves.

Specifically, it envisions a recovery system for alerting to an event requiring initiation of recovery efforts, identifying by unique identifier a person or object in need of recovery, providing interim survival means for the person or object, and locating the person or object with sufficient accuracy to effect a recovery. A preferred embodiment of the present invention may include a "rescue package" containing:

an attachable apparatus that may enable the person or object to float such as a lifejacket for a person and a water-activated inflatable attachment for an object, a transmitter with a robust conformable antenna, for sending a location and positive unique identifier to a receiver onboard a ship or suitable rescue vehicle such as an aircraft or helicopter; and a monitored receiver that may be installed in a small, lightweight, low cost, yet robust package, with suitable antenna to allow receipt of low-power signals from the transmitter on the person or object.

The life jacket or inflatable attachment for an object, with attached transmitter and robust conformable antenna, may be designed to provide flotation for the person or object only upon entry into water, thus reducing bulk when used onboard the ship. One example of a life jacket incorporated herein by reference is provided in U.S. Pat. No. 6,066,017, Inflatable Non-Collapsible Personal Flotation Device, issued to Max et al., May 23, 2000, in which a thin vest is inflated with pliant foam upon entry into water, the foam conforming to the wearer's torso thereby providing some insulation against the environment, and further providing an abrasion and puncture resistant device for flotation in environments in which floating debris may puncture air-filled chambers of a flotation device.

The receiver subsystem, possibly detecting signal levels at least as low as −118 dBm, is designed to provide an audible, visual, audio-visual, or other indication that will be timely provided to a decision maker, be it human or electronic, that promptly notifies at least one person of the need to begin a rescue operation.. Further, the lifejacket or flotation device may be brightly colored and have light-reflective strips affixed externally thereto. The lifejacket, with integral antenna, may be constructed of material suitable for cleaning, including immersion in aqueous solutions that include surfactants.

The transmitter may be an RF transmitter that may be manually or automatically activated, employing an appropriate sensor, upon some event such as immersion in water after a short period of a few seconds. The transmitter may be designed so as to operate with existing systems as well as those specially designed for decoding any encoded signal therefrom. The transmitter system may be provided with an encoder that establishes the identity of the person or object in need of recovery. The code may be changed periodically. Further, it may be equipped (integrally or suitably interfaced) with a suitable power source, typically a small battery but at least one battery that may be re-chargeable, or possibly at least one solar panel, a manually operated generator, a chemical-mechanical generator, or any combination of the above. It may be capable of operation under a variety of adverse conditions, such as temperature and humidity extremes, vibration, shock, and exposure to corrosive environments such as saltwater and noxious fumes. Operation under adverse conditions may be assured for both "actual emergency use" conditions and in "stand-by" mode (e.g., during wear on duty onboard a ship). The battery, including any backup, may have a shelf-life of at least one year and be able to operate for at least 3 days in varying modes, including pre-selected intermittent operation, suitable to effect rescue operations over a 3-day period.

The antenna associated with the transmitter may be integrally affixed to the lifejacket or inflatable device in a manner such that it will not protrude conspicuously from the plane of the fabric nor be in danger of damage because it may catch on something and become detached or broken. Further connections from the antenna to the transmitter module, hereinafter Personal Locator Beacon module or PLB module, may be integrally incorporated into the fabric of the lifejacket or inflatable device. An antenna described in patent application Ser. No. 09/548,841, Antenna Conformable in Three Dimensions, filed Apr. 13, 2000, assigned to the Assignee of this invention, provides a suitable solution and is incorporated herein by reference as a preferred embodiment of the antenna to be used for this purpose. Further, the antenna may be capable of transmitting an omni-directional signal on one or more frequencies, at an average power of a few milli-watts (mW) (typically 5–15 mW).

In an embodiment of the present invention, upon activation, the communications device pauses during a first period to establish that the pre-specified event, such as the detection of water, has occurred and the sensor activates operation of the communications device upon establishing the occurrence. Upon activation, the RF transmitter transmits continually for a second period of between one-half hour and one and one-half hours. During a third period of zone to five hours immediately succeeding the second period, the RF transmitter operates at a duty cycle of between 15% and 35%. During a fourth period immediately succeeding the third period, the RF transmitter transmits at a duty cycle of between 5% and 15%. In another embodiment, the first period is between 10 and 20 seconds, the second period is between 50 minutes and 70 minutes and the third period is between 3.5 hours and 4.5 hours. During the third period, the RF transmitter operates at a duty cycle between 20% and 30% and the fourth period first occurring at between 4 hours, 20 minutes and 5 hours, forty minutes. During the fourth period, the RF transmitter operates at a duty cycle between 8% and 12% and the RF transmitter of the communications apparatus may operate for a total period of between 60 hours and 84 hours.

The receiver may be suitable for scanning, recognizing, optionally recording, and reporting received transmissions on the frequency or frequencies on which the low power transmitter integral to the lifejacket or flotation apparatus is capable of operation. In addition to receiving signals from the "rescue transmitter," the receiver should provide an interface, with possible backup, to an alerting system for assuring rescue personnel are alerted on a timely basis. This interface may be to a capability integral to the receiver or tie-in to existing warning or alerting devices onboard rescue vehicles, including ships, fixed-wing aircraft. helicopters or to "communications relays" such as shore stations or communications satellites. Power for the receiver may comprise any of a number of options including shipboard power with battery backup, re-chargeable battery pack, aircraft power, or even commercial power for operations in littoral areas.

The system may further provide for periodic, including daily, changes to a unique code assigned to each PLB module for identification of the individual or object associated thereto. This may be carried out via an associated card having a magnetic stripe that may be re-programmed at will in a manner similar to electronic keys provided for room locks at hotels.

Advantages of preferred embodiments of the present invention, as compared to conventional systems, include permitting:

reduced man-hours for effecting rescue;

reduced man-hours for determining who or what is missing;

improved opportunity for quick recovery;

comfortable wear in use because it is lightweight, robust, and unobtrusive;

improved robustness;

use in adverse environmental conditions both in stand-by and during operation;

simplified fabrication using COTS hardware;

inexpensive fabrication thus being available to more users because of low cost;

low maintenance costs;

increased flexibility for use;

high reliability;

improved security and reduced chance of spoofing or false alarms;

simplified design of alternate configurations; and ready upgradability to state-of-the-art electronics modifications.

Embodiments of the present invention can be applied to operations in hazardous conditions that may be associated with military, police, firefighters, or inherently hazardous commercial operations such as commercial fishing, offshore oil rigs and mining. Use of this apparatus saves lives as well as operations down time and training requirements for both the potential rescuer and potential victim. Preferred embodiments are fully disclosed below, albeit without placing limitations thereon.

DETAILED DESCRIPTION

Figure 1:
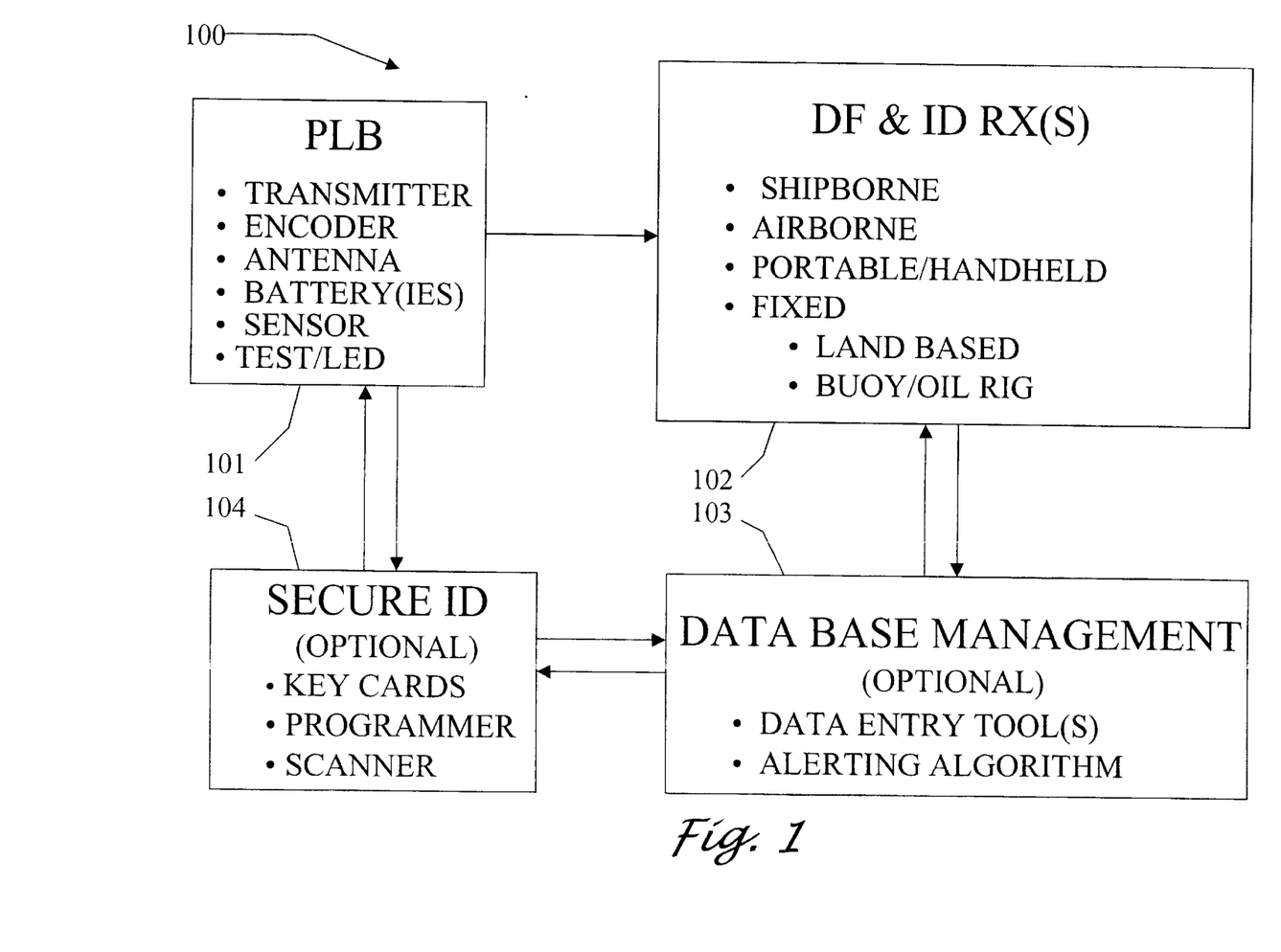
FIG. 1 is a system block diagram detailing functions and major electronic components of a preferred embodiment of the present invention.

A block diagram 100 of the operation of the electronics associated with a preferred embodiment of the present invention is presented in FIG. 1. A personal locator beacon (PLB) 101, most commonly utilizing an RF beacon, consisting of a transmitter, an encoder, an antenna, and a power source, most commonly a light weight disposable battery. are provided in a compact package for insertion in, or attachment to, a personal flotation device (PFD), such as the lifejacket 200 shown in FIG. 2. In a preferred embodiment of the present invention, the transmitter, encoder, and battery are enclosed in a waterproof and shock resistant housing 202 with suitable "weatherproof" connectors 208 therefrom for connecting to an antenna 201A, 201B. In a preferred embodiment of the present invention, both the antenna 201A, 201B, in one embodiment an antenna that may be made mostly of "cloth" as provided in U.S. patent application Ser. No. 09/548,841, Antenna Conformable in Three Dimensions, and its associated connectors (not separately shown) for connection to the PLB 101 at connectors 212 are "sewn into" the PFD. There is also provided a removable lid (not separately shown), with hinge or tether (not separately shown), over the battery compartment(s) 207 within the housing 202, having a suitable seal such as a rubber or silicon O-ring (not separately shown), for ease in replacing the battery (not separately shown). Optionally, a "backup" battery (not separately shown) may be provided in a separate enclosure 207 in the housing 202, the second enclosure having the same, or similar, removable lid (not separately shown) as provided for the main battery. The life jacket 200, in one embodiment, may be one such as those worn by U.S. Navy sailors while deployed on deck at sea, i.e., the U.S. Navy "float coat" 200 as depicted in FIG. 2 or an alternative U.S. Navy inflatable non-collapsible PFD (INCPFD) 300 as depicted in FIG. 3 or any of a number of suitable commercial flotation devices (not separately shown) that may be adapted for use.

The complementary sensitive direction finding (DF) and identification (ID) receiver (Rx) sub-system 102 consists of portable or fixed receiver systems designed to receive, amplify. and process, e.g., decode, the signal, optionally encoded, that is automatically sent by the PLB 101 within seconds after an "qualifying event," such as unplanned entry of a person or object into water. The resultant "processed" signal is used to generate an appropriate alert, including a unique identity for the person or object. The generated alert to potential rescuers nearby may be visual, audio, audio-visual, or any combination thereof. The DR&ID Rx 102 may be permanently installed in ships, lifeboats, submersibles, aircraft, or at fixed stations either land based or offshore, such as an oil rig. It may also be carried on the person of rescuers, including robots, that may be airlifted or brought to the scene in smaller watercraft or even via submerged watercraft such as small rescue submersibles. In its simplest form, neither the PLB 101 nor the DR&ID Rx 102 require receipt or processing of GPS signals to effect timely recovery. Although, GPS is not required in one embodiment, other applications may require some of the benefits GPS provides and GPS circuitry (not separately shown) may be incorporated into either the PLB 101 or the DF & ID Rx 102, or both.

One option provided for in a preferred embodiment of the present invention is a data base management function 103 associated with the DF&ID Rx 102. It provides a data entry tool, which may include options for either manual or automatic data capture, for collecting information about the "man overboard" or lost equipment event into an event database (not separately shown). Through an alerting algorithm, an automated alarm may be provided to at least one source of recovery resources. To ensure timely initiation of recovery efforts, a feedback mechanism acknowledging receipt of the alarm message may be required to "quiet" the alarm.

Figure 2:
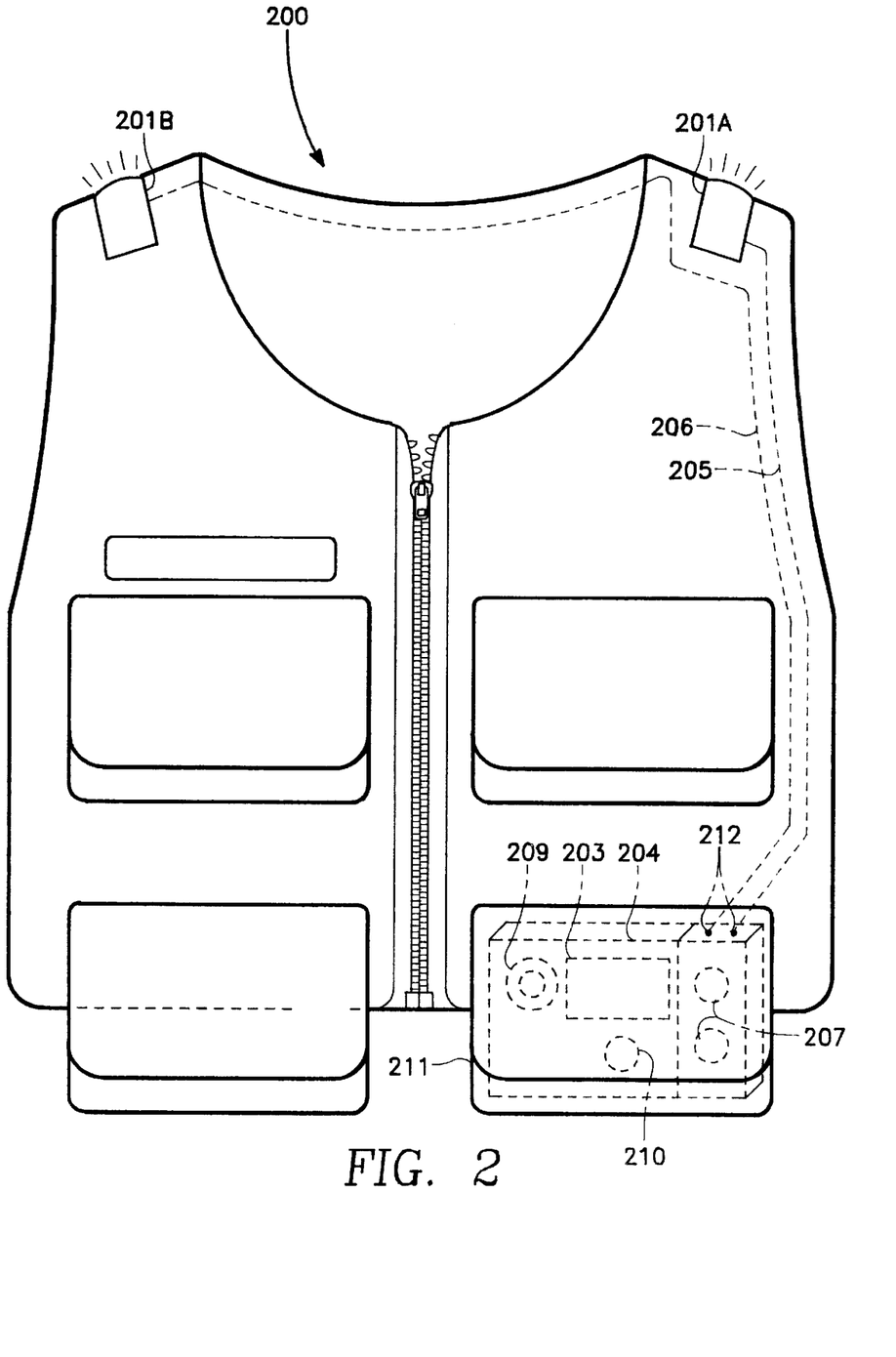
FIG. 2 represents a preferred embodiment of the present invention as used with a U.S. Navy "floatcoat" for personnel.
Figure 3:
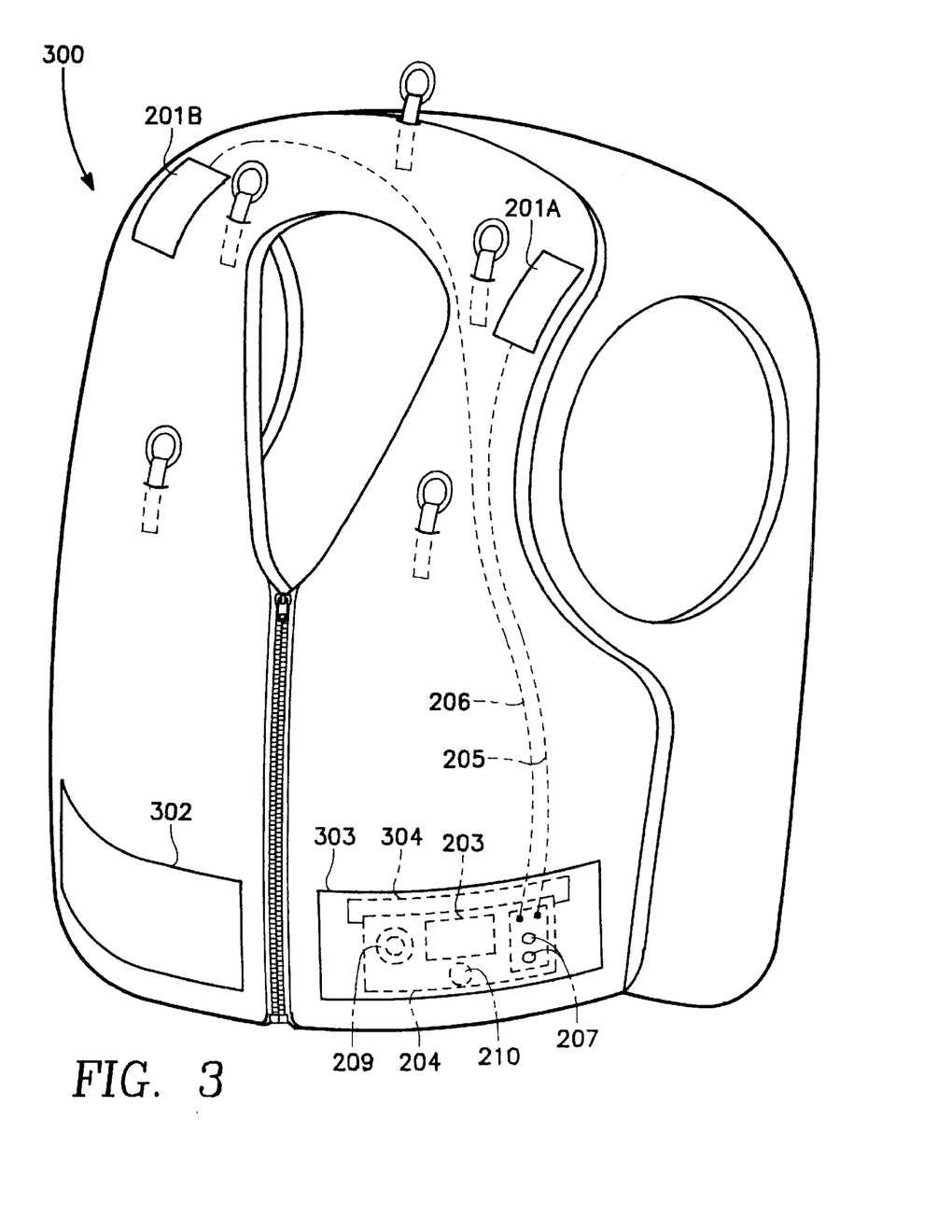
FIG. 3 represents an alternative configuration of the floatcoat of FIG. 2.

Referring to FIG. 2 as well as FIG. 1 for this and following discussions, another option includes a secure identification (Secure ID) function 104 that provides for periodically updating codes to the PLB module 204 via programming a electromagnetic element on a "key card" (not separately shown) and swiping the key card across a optional electromagnetic sensor for use by an individual to then scan data from the key card into the PLB module 204 at specified update periods. This operates in a similar fashion to a credit card or the programmable key cards used for access to individual hotel rooms.

Figure 4:
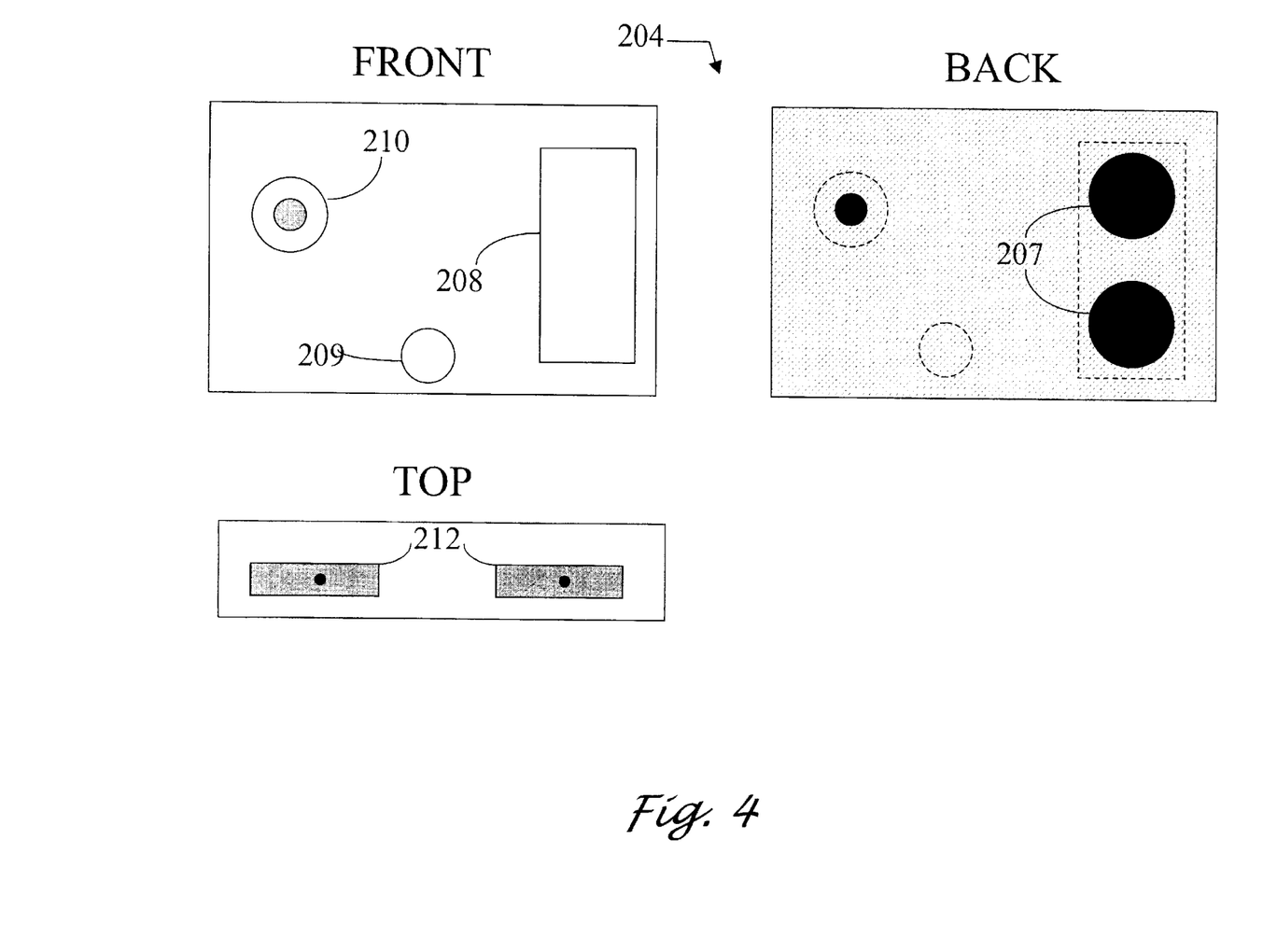
FIG. 4 represents various views of the beacon module to be used in a preferred embodiment of the present invention.

Specifically, referring to FIGS. 1, 2 and 4, a preferred embodiment of the present invention may be assembled as follows:

a) a life jacket 200, optionally having light-reflective and radar reflective strips (not separately shown) embedded in its outer surface, is provided with a pocket 211 secured by hook and loop fasteners (not separately shown) for retention of a PLB module 204 (for the PLB 101 represented in the block diagram of FIG. 1), having at least one battery in compartment 207, at least one immersion sensor 210 located low on the life jacket 200 so as to contact water within seconds after immersion, and at least one antenna connector 212 on the upper outside of the PLB module's housing 202. In addition, an optional test button 209, with built-in LED, is provided for a user to test for proper operation, including status of batteries and circuit continuity;

b) at least one antenna 201A, with wiring 205 and integral antenna connectors sewn into the life jacket 200 and leading to the connector(s) 212, is sewn into a portion of the life jacket 200 that will be near the highest point on the life jacket 200 when deployed for its intended use, e.g., to maintain a person or object afloat. In FIG. 2, the highest point is shown at the shoulders where antennas 201A, and optional antenna 201B, are shown as integral parts of the life jacket 200. The optional antenna 201B may be provided should one shoulder of the life jacket 200 suffer severe damage in an accident;

c) a retainer, e.g., complementary hook and loop strips (not separately shown) may be used to close the pocket 208 in which the control module is held. Alternatively, the control module may be sewn into the inside of the pocket 208 with access to the enclosed battery compartment provided via an opening (not separately shown) in the material from the inside of the pocket 208 and a small opening (not separately shown) for an immersion sensor 210 in the front of the pocket as well as an additional small opening (not separately shown) for the test button/LED 209;

d) alternatively, the inflatable non-collapsible PFD 300 of FIG. 3 is provided with a pocket 303 secured by hook and loop fasteners 304 in addition to the existing pocket 302 for the foam emplacement device (not separately shown). The pocket 303 carries the PLB module 204 while also incorporating a sewn in antenna 201A (with optional backup antenna 201B) and necessary wiring 205 to antenna 201A and wiring 206 to optional antenna 201B;

e) another alternative may employ the above elements in a carrier pack (not separately shown) for a parachute (not separately shown), including an inflatable life vest (not separately shown) for temporary flotation in case of egress over water; and f) an optional receiver system (DF&ID Rx) 102 utilizing high temperature superconductor (HTS) RF bandpass filters that minimize RF interference so that received signal levels of at least as low as −118 dBm from the PLB module 204 may be processed reliably. The DF&ID Rx 102 may further use at least one antenna (not separately shown) that may be any of the following: a translatable high-gain directional antenna, a directional antenna rotating at a pre-selected rate, and multiple fixed directional antennas, or combinations thereof. Note that although this optional receiver system 102 may be used, the PLB module 204 may be designed in "uncoded" mode to allow receipt and processing of its transmissions at RF frequencies of existing "guard" channels monitored by the Coast Guard or volunteers such as the Civil Air Patrol.

g) an optional database 103 that may be accessed through common interfaces (not separately shown) to wireless communications devices, telephone lines, the Internet, or satellites (each not separately shown).

h) an optional secure ID system 104, associated with the database function, that provides for periodic, including daily, changes to a unique code assigned to each PLB module 204 for identification of the individual or object associated thereto. This may be carried out via an associated card (not separately shown) having a magnetic stripe that may be re-programmed at will and scanned by the PLB module 204 at magnetic sensor 203 in a manner similar to electronic keys provided for room locks at hotels.

EXAMPLES

In a preferred embodiment of the present invention, the operational cycle of the PLB 204 is as follows. Upon immersion in water, this environmental status is detected by a sensor 210. The sensor 210 then activates the PLB module 204 after about 10–15 seconds of monitoring to be sure that the PLB module 204 is immersed in water and that it is not a temporary condition, thus reducing the opportunity for false alarms. If the PLB module 204 remains in water, it transmits continuously for the first hour of immersion. Over the next four hours, the PLB's transmitter operates at a duty cycle of approximately 15 seconds on and 45 seconds off. This conserves battery life. After this first five hours of operation, the PLB 204 transmits for about 6 seconds out of every minute until the battery dies, nominally after three days.

In another embodiment, the operational cycle of the PLB 204 may be as follows. Upon ejection from an aircraft, this environmental status, e.g., excess G-force coupled with the increased airflow in the "slip" across the sensor 210, or a rapid change in attitude angle, or any combination thereof, is detected by sensor 210. The sensor 210 then activates the PLB module 204 after about 10–15 seconds, insuring that the aircrew member (or object) did eject, thus reducing the opportunity for false alarms. If the status is thus verified, the PLB 204 transmits as in the first example above. The apparatus upon which this PLB 204 is fitted may be an inflatable life vest 300 or the "carrier pack" for a parachute.

The above descriptions should not be construed as limiting the scope of the invention but as mere illustrations of preferred embodiments. For example, although examples discussed at length the use of a recovery system incorporated in a life jacket, such as a U.S. Navy float coat, the method and apparatus is applicable to any alerting situation that a user may need to apply it to, such as mine rescue, car hijacking, tracking of handicapped personnel, or even maintaining the whereabouts of parolees. In addition, the device is useful for recovering objects such as the "black boxes" onboard commercial aircraft since it provides not only a locating beacon but also provision for flotation in the event of an accident over water. The scope shall be determined by appended claims as interpreted in light of the above specification.

We claim:

1. A recovery system for alerting to an event requiring initiation of recovery efforts, identifying by unique identifier a person or object in need of recovery, providing interim support means for the person or object, and locating the person or object with sufficient accuracy to effect a recovery, comprising:

an attachable apparatus that supports the person or object, wherein said attachable apparatus is suitable for constant wear by the person when engaged in activities that require moderate physical exertion;

a communications device having at least a transmit function, wherein said communications device comprises a personal locator beacon (PLB) module incorporating at least one RF transmitter that may be manually or automatically activated, at least one antenna, a power source, operable connections between said at least one RF transmitter, said power source, and said at least one antenna, wherein said at least one RF transmitter that operates with an average power output of less than 15 mW, and at least one sensor in operable communication with at least said at least one transmitter, wherein said at least one sensor detects the occurrence of a pre-specified event for use in activation of said communications device, wherein said activation of said communications device pauses during a first period to establish that said pre-specified event has occurred and said at least one sensor activates operation of said communications device upon establishing said occurrence, wherein, upon said activation, said at least one RF transmitter transmits continually for a second period of between one-half hour and one and one-half hours, wherein during a third period of one to five hours immediately succeeding said second period, said at least one RF transmitter operates at a duty cycle of between 15% and 35%, wherein during a fourth period immediately succeeding said third period, said at least one RF transmitter transmits at a duty cycle of between 5% and 15%, wherein said communications device is suitable for affixing unobtrusively to said attachable device; and a small, lightweight, low cost receiving sub-system,
   wherein said receiving sub-system is monitored at least on a guard channel, and
   wherein said receiving sub-system provides a timely indication of a need to initiate a recovery effort.

2. The recovery system of claim 1, wherein
said first period is between 10 and 20 seconds,
said second period is between 50 minutes and 70 minutes,
said third period is between 3.5 hours and 4.5 hours,
   wherein during said third period, said at least one RF transmitter operates at a duty cycle between 20% and 30%,
said fourth period first occurring at between 4 hours, 20 minutes and 5 hours, forty minutes,
   wherein during said fourth period, said at least one RF transmitter operates at a duty cycle between 8% and 12%, and
wherein said at least one RF transmitter of said communications apparatus may operate for a total period of between 60 hours and 84 hours.

3. A method facilitating recovery of a person or object, comprising:
providing temporary support for the person or the object;
using a communications device, affixed to said temporary support and incorporating at least one transmitter, to transmit an encoded signal at a average power level of less than 15 mW;
alerting resources external to said person or said object to an event requiring initiation of recovery efforts,
   wherein said event requiring initiation of recovery efforts involves a person or object being separated from a waterborne vessel and being immersed in water,
   wherein said alerting further comprises:
      providing at least one sensor as an operable part of said communications device,
         wherein said sensor detects the occurrence of a pre-specified event associated with specific environmental characteristics, and
      pausing during a first period to establish that said pre-specified event has occurred, and
      upon establishing said occurrence, said sensor activates operation of said communications device,
         wherein, upon said activation, said at least one transmitter transmits continually for a second period of between one-half hour and one and one-half hours, and
         wherein during a third period of one to five hours immediately succeeding said second period, said at least one transmitter operates at a duty cycle of between 15% and 35%, and
         wherein during a fourth period immediately succeeding said third period, said at least one transmitter transmits at a duty cycle of between 5% and 15%;
monitoring to recognize said alerting;
identifying, via said encoded signal, the person or object in need of recovery; and
locating the person or object with sufficient accuracy to effect the recovery,
   wherein the location of the person or object is as provided in either absolute coordinates or as a position relative to a recovery means.

4. The method of claim 3 wherein said alerting further comprises:
said first period of between 10 and 20 seconds,
said second period of between 50 minutes and 70 minutes;
said third period of between 3.5 hours and 4.5 hours,
   wherein transmitting during said third period occurs at a duty cycle between 20% and 30%; and
said fourth period first occurring at between 4 hours, 20 minutes and 5 hours, forty minutes,
   wherein transmitting during said fourth period is at a duty cycle between 8% and 12%;
wherein said transmitter of said communications apparatus may operate for a total period of between 60 hours and 84 hours.

5. An integral support and alerting system for signaling an event requiring initiation of recovery efforts, identifying by unique identifier a person or object in need of recovery, providing interim support means for the person or object, and providing a signal from which the location of the person or object can be attained with sufficient accuracy to effect a recovery, comprising:
an attachable apparatus that supports the person or object,
   wherein said attachable apparatus is suitable for constant wear by the person when engaged in activities that require strenuous physical exertion; and
a communications device, having at least a transmit function, for transmitting at least one signal of less than 15 mW average power to a sensitive receiver system,
   wherein said communications device comprises a personal locator beacon (PLB) module incorporating an RF transmitter that may be manually or automatically activated, at least one antenna, a power source, and operable connections between said transmitter, said power source, and said at least one antenna,
   wherein said communications device further comprises a sensor in operable communication with at least said transmitter,
   wherein said sensor provides an indication of the occurrence of a pre-specified event for use in activating said communications device,
   wherein said communications device is affixed unobtrusively to said attachable device, and
   wherein, at least parts of said communications device follow the outer contour of said attachable apparatus, conforming smoothly, and freely flexing with said outer contour,
   wherein said communications device pauses during a first period to establish that said pre-specified event has occurred and said at least one sensor activates operation of said communications device upon establishing said occurrence,
   wherein, upon said activation, said at least one RF transmitter transmits continually for a second period of between one-half hour and one and one-half hours, and
   wherein during a third period of one to five hours immediately succeeding said second period, said at least one RF transmitter operates at a duty cycle of between 15% and 35%, and
   wherein during a fourth period immediately succeeding said third period, said at least one RF transmitter transmits at a duty cycle of between 5% and 15%,
   wherein, upon receipt of said signal by a receiver, said at least one signal is processed, and information relayed, as a timely indication of a need to initiate a recovery effort.

6. The integral support and alerting system of claim 5, wherein
said first period is between 10 and 20 seconds, said second period is between 50 minutes and 70 minutes, said third period is between 3.5 hours and 4.5 hours,
wherein during said third period, said at least one RF transmitter operates at a duty cycle between 20% and 30%, said fourth period first occurring at between 4 hours, 20 minutes and 5 hours, forty minutes, wherein during said fourth period, said at least one RF transmitter operates at a duty cycle between 8% and 12%, and wherein said at least one RF transmitter of said communications apparatus may operate for a total period of between 60 hours and 84 hours.

\* \* \* \* \*